Dec. 27, 1927.
V. L. WILSON ET AL
1,654,028
TREE GUARD
Filed Oct. 10, 1925
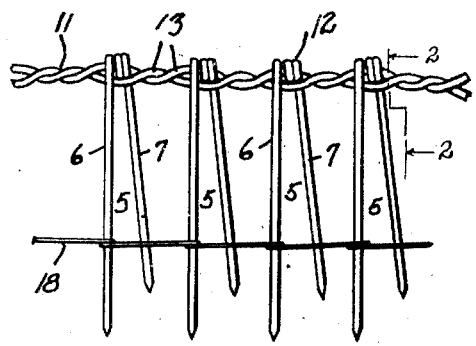
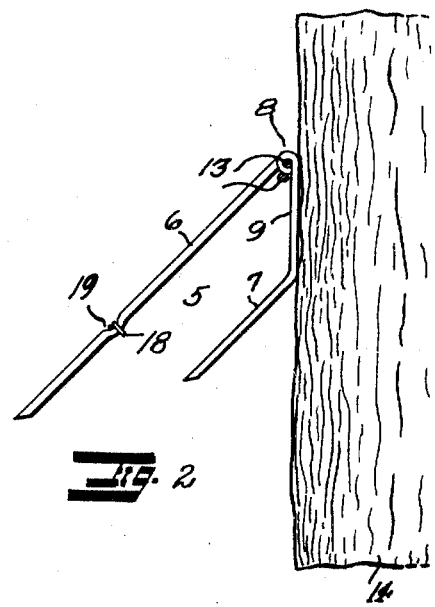
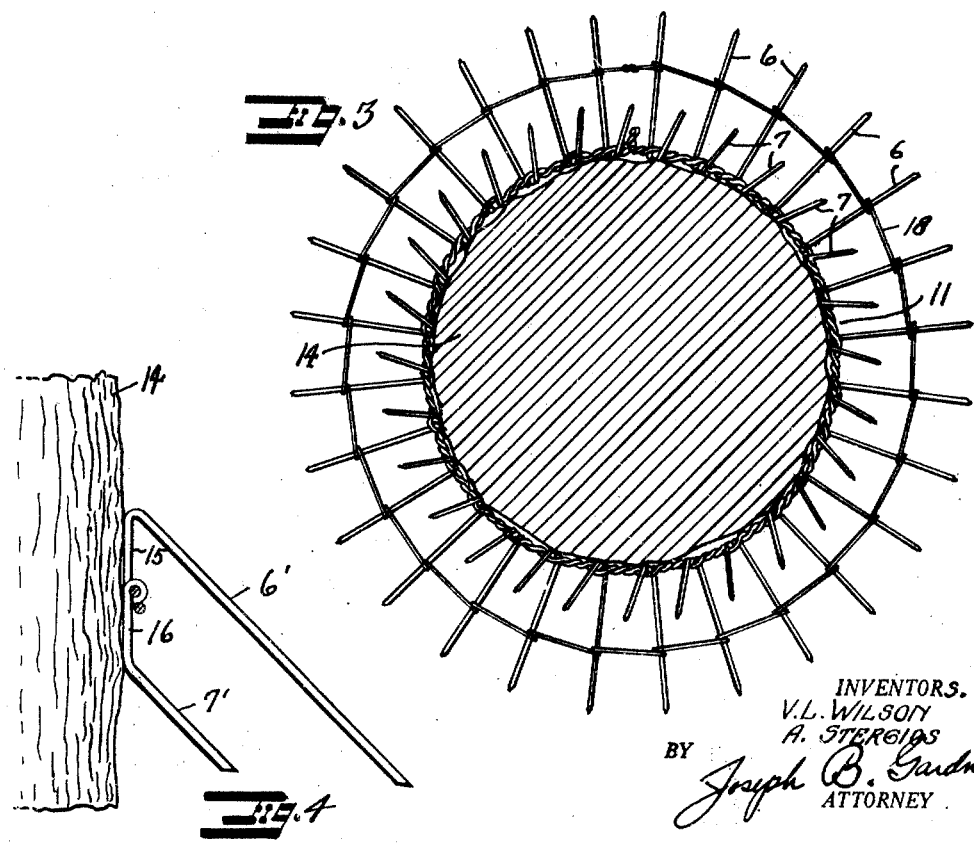
INVENTORS.
V. L. WILSON
A. STERGIOS
BY Joseph B. Gardner
ATTORNEY Patented Dec. 27, 1927.

1,654,028

UNITED STATES PATENT OFFICE.

VALENTINE LELAND WILSON AND ALEXANDER STERGIOS, OF PAPEETE, TAHITI, SOCIETY ISLANDS.

TREE GUARD.

Application filed October 10, 1925. Serial No. 61,661.

Our invention relates to a device for preventing the climbing of tree trunks by animals such as climbing rodents and marsupials.

An object of the invention is to provide a device of the character described which is extremely efficient and at the same time is inexpensive to manufacture.

Another object of the invention is to provide a device of the character described which may be attached to and positively held operatively positioned on a tree-trunk without marring the same.

A further object of the invention is to provide a device of the character described which may be assembled in the form of a continuous strip adapted to be wound on a drum or the like, and from which pieces of appropriate length may be cut for use on tree-trunks of different girths.

Our invention possesses other objects and features of advantage, some of which, with the foregoing, will be set forth in the following description of the preferred form of our invention which is illustrated in the drawings accompanying and forming part of the specification. It is to be understood that we do not limit ourselves to the showing made by the said drawings and descriptions, as we may adopt variations of the preferred form within the scope of our invention as set forth in the claims.

Referring to said drawings:

Figure 1 is a side view of a section of the guard.

Figure 2 is a view taken on the line 2—2 in Figure 1 showing a prong unit of the guard operatively disposed against a tree-trunk.

Figure 3 is a plan view showing the guard operatively disposed about a tree trunk.

Figure 4 is a view similar to that of Figure 2 showing a modified form of the prong unit.

In many places, and particularly in tropical countries, the successful production of fruits and nuts is seriously interfered with by animals which climb the trees to eat and otherwise destroy the crops. It therefore becomes necessary to prevent the scaling of the trees by these animals in order to permit of profitable production, which object is accomplished by our invention in an extremely simple and efficient manner. Briefly expressed, the device of our invention comprises a guard provided by supporting around the tree trunk a row of prongs which are arranged to extend outwardly and downwardly of the trunk so as to present against an animal, which may attempt to climb past them, an endless barrier of sharp points. To facilitate the handling and positioning of the pronged members they are preferably mounted in properly spaced relation along a relatively stiff but flexible connecting member which may be bent to girdle a tree trunk in conformity with its shape and thereby position the prongs in a row in properly spaced relation on the trunk and in desired angular relation thereto.

In the present embodiment of our invention, prong units or members 5 are provided having upper and lower prong portions 6 and 7 extending therefrom and preferably sharpened. The prongs 6, it will be noted, are longer than are the prongs 7 and are preferably fixedly associated with their corresponding prongs 6 by means of a connecting or base portion 8 of the member. As here shown, the portions 6, 7 and 8 of the member are made integral and are conveniently formed of wire of such size as to provide a structure of requisite stiffness.

The members 5, it may be noted, could be secured to the tree with the prongs 6 and 7 positioned to extend outwardly therefrom, by the use of staples or similar fastening means. But fastening the members 5 in this manner will not be found generally practicable since it involves the separate handling and securing of a large number of pieces, and it is not always feasible or desirable to drive fasteners into many kinds of trees on which the guard may be desirably mounted. Accordingly, means are provided for simplifying the mounting process by the preassembly of a plurality of members 5 to form a single guard unit which may be secured to a tree trunk in a quick and simple manner. As here shown, such means comprises a band or girdle member 11 on which the members 5 are arranged to be mounted in spaced relation. In the present embodiment a loop 12 is provided in the portion 8 of the member 5 through which one of two wire strands 13 is arranged to be passed, the wires 13 being twisted together between adjacent members 5. By forming the loops 12 with a plurality of turns, the members 5, it will be noted, will be effectively held fixed on and with respect to the band member. If desired, and as here shown, the prong 7 may be formed to have a portion 9 adjacent the base portion 8 which is arranged to bear against the tree and thereby prevent the point of the prong from being positioned thereagainst.

As here illustrated, the point of the prongs 7 lies inwardly of that of the prongs 6, and between them when the device is viewed as in Figure 3, but it will be readily understood that other relationships might be desirable. It will also be understood that the prongs, instead of being disposed in superposed planes, may be arranged in a common plane, and that as many prongs, or sets or rows of the prongs may be supported by the girdle as conditions might warrant. Furthermore, and as here shown, it may be desirable to brace the prongs 6 after the device is installed by connecting the prongs 6 with a strand 18 preferably secured to the prongs at notches 19 provided therein.

Applying of the guard unit may be simply effected by wrapping it around the tree trunk and either twisting the registering band ends together as here shown, or securing them directly to the tree. During the positioning of the guard, the prong portion 9 will cooperate with the tree trunk to limit the inward positioning of the prongs and thereby hold them properly disposed.

In the embodiment shown in Figure 4, the prongs 6' and 7' are both provided with portions 15 and 16 which are arranged to bear against the tree trunk 14, so that as the guard is positioned about the tree rotation of the girdle and prongs will be positively prevented in either direction.

Since the guard of our invention will be used about trees of different girths, a plurality of guard units is desirably primarily formed by securing the members 5 in spaced relation along strands 13 of considerable length, the resulting assembly being adapted to be rolled on a drum or spool from which guard units may be cut having the different required lengths. In this manner, waste of material is avoided, and a convenient method of handling is provided.

We claim:

1. Stock for tree guards comprising a continuous strand of flexible material arranged to be cut into sections of suitable length to encircle tree trunks, and provided with a plurality of similar numbers providing pairs of wire prongs similarly and fixedly positioned therealong to terminate at substantially the same side of said strand whereby all of said prongs will extend outwardly from a trunk where one of said strand sections is fixed therearound, a prong of each of said pairs thereof being shorter than the other, the shorter of said prongs being arranged to lie inwardly of the longer and under the same.

2. A tree guard comprising a band arranged to be fixed about a tree trunk comprising, a plurality of prongs fixedly secured at their base to said band and terminating at substantially the same side of said strand whereby all of said prongs may extend outwardly from said trunk and said band may lie against said trunk when said band is fixed about said trunk, and means exclusive of said band and positioned outwardly therefrom for securing said prongs together.

In testimony whereof, we have hereunto set our hands at Papeete, Tahiti, this 21st day of September, 1925.

VALENTINE LELAND WILSON.
ALEXANDER STERGIOS.